United States Patent [19]
Grano, Jr.

[11] 4,063,919
[45] Dec. 20, 1977

[54] FERTILIZER RODS

[75] Inventor: Joseph Grano, Jr., Ludlow, Mass.

[73] Assignee: Monsanto Company, St. Louis, Mo.

[21] Appl. No.: 697,167

[22] Filed: June 17, 1976

[51] Int. Cl.² ............................................. C05F 11/00
[52] U.S. Cl. .......................................... 71/11; 71/27;
71/29; 71/32; 71/64 A; 71/64 F; 71/64 G;
47/48.5
[58] Field of Search ...................... 71/27, 11, 29, 64 F,
71/64 A, 64 SC, 32, 33, 64 G, 64 R; 47/48.5;
252/174, DIG. 16

[56] References Cited

U.S. PATENT DOCUMENTS

| 3,232,007 | 2/1966 | Boatwright | 71/64 A X |
|---|---|---|---|
| 3,647,416 | 3/1972 | Messman | 71/29 |
| 3,900,378 | 8/1975 | Yen et al. | 71/64 S X |
| 3,933,458 | 1/1976 | Philipp | 71/27 |

OTHER PUBLICATIONS

Hackh's Chem. Dict., 4th Ed., Grant, 1974, pp. 527, 625.
The Condensed Chem. Dict., 8th Ed., Hawley 1974, pp. 699–700.

*Primary Examiner*—Charles N. Hart
*Assistant Examiner*—Ferris H. Lander
*Attorney, Agent, or Firm*—Joseph S. Nelson; William J. Farrington; James C. Logomasini

[57] ABSTRACT

The invention relates to a fertilizer rod composition comprising about 100 parts of a polyvinyl alcohol, about 0 to 20 parts of a plasticizer and about 10 to 350 parts of a fertilizer, a process for producing said rod and a product of said process.

16 Claims, No Drawings

FERTILIZER RODS

BACKGROUND OF THE INVENTION

House plants and greenhouse plants need fertilization to realize optimum growth. Such fertilization has been a time consuming, wasteful and inaccurate process. A controlled method of feeding such plants is a long standing need in the home and in industrial greenhouses.

Liquid and powdered fertilizers have been used but are lost through the soil as the plants are continually watered wasting a national resource. There has now been discovered a fertilizer rod composition comprising a polyvinyl alcohol polymer, a plasticizer and a fertilizer, said rod having cold water solubility, is biodegradable, nontoxic and as a rod or composite meters the release of fertilizer into the soil supplying plant nutients on a controlled basis. The rods can be varied in size as to length and cross section and number used to provide exact amount of food to the plant. Such rods are readily stored, handled and used providing low cost systems of fertilization. The rods are inserted into the soil around the plant and gradually dissolve to provide plant food. The danger of overfertilizing are minimized along with the danger of using liquids or powders which are corrosive and toxic.

SUMMARY OF THE INVENTION

The invention relates to a fertilizer rod composition comprising:
A. about 100 parts by weight of a polyvinyl alcohol polymer,
B. about 0 to 20 parts by weight of a plasticizer for said polyvinyl alcohol, and
C. about 10 to 350 parts by weight of a fertilizer.

The invention also relates to a method for preparing fertilizer rods comprising the steps:
A. dry blending about 100 parts by weight of a granular polyvinyl alcohol with about 0 to 20 parts by weight of a plasticizer forming a first dry blend,
B. mixing said first dry blend with from about 10 to 350 parts by weight of a fertilizer to form a second dry blend followed by,
C. melt extruding said second dry blend through a profile die forming a fertilizer rod.

The invention also relates to fertilizer rod produced by the process disclosed above.

DESCRIPTION OF PREFERRED EMBODIMENTS

The polyvinyl alcohol polymer used in the present invention is generally well known in the art. The polymer is generally prepared by alkaline or acid hydrolysis of a polyvinyl ester such as polyvinyl acetate, polyvinyl formate, polyvinyl propionate and the like. The preferred polyvinyl ester is polyvinyl acetate. Methods of preparation are described in the reference, "Vinyl and Related Polymers" by C. E. Schildknect, John Wiley and Sons, New York, New York (1952, pages 341-357) hereby incorporated by reference.

Polyvinyl alcohol polymers are thermoplastic and are water soluble. The polymers are used as binders for the fertilizer particles forming a matrix phase having the fertilizer particles dispersed therein in the form of rods or composites. The polyvinyl alcohol polymer can be a completely hydrolyzed polyvinyl acetate containing no residual polyvinyl acetate or be a partially hydrolyzed polyvinyl acetate having up to 45 percent by weight of residual polyvinyl acetate. Preferable the residual polyvinyl acetate will range from about 0 to 45 percent by weight most preferably 10 to 20 percent by weight based on the weight of the polymer.

The polyvinyl alcohol polymer has a molecular weight ranging from 5,000 to 150,000, preferably 10,000 to 100,000. Aqueous solutions of the polymers have a viscosity ranging from about 4 to 65 cps based on 4 percent solution at 20° C.

The polyvinyl alcohol polymer is thermoplastic and can be formed into articles by molding or extrusion. The lower molecular weight resins, plasticized or unplasticized, are readily molded or extruded whereas the higher molecular resins are generally plasticized to improve plastic flow during fabrication. Generally, the molding or extrusion of polyvinyl alcohol resins are carried out at temperatures in the range 65°-185° C., preferably 90° to 110° C. consistent with the stability of the resin.

Plasticizers for polyvinyl alcohol are preferably of the polyhydric alcohol type, e.g., those selected from the group consisting of ethylene glycol, triethylene glycl, polyethylene glycol, glycerine, trimethylol propane, sorbitol, mannitol and water soluble polyglycols having 4 to 20 carbon atoms. Suitable plasticizers for the present invention include: tetrahydrofurfuryl alcohol, tributyl phosphate, tributyl oxyethyl phosphate, dimethyl formamide, ethanol formamide, ethanol acetamide, acetamide, trimethylol propane, combinations of glycerine and alkyl resins derived from the reaction between diethylene glycol and adipic acid, triacetin, polyglycerol, dibutyl phthalate, diphenyl phthalate, alkylated diglycerol, sorbitol, polyglycols containing from 4 to 20 carbon atoms in the molecule such as 2,3-butylene glycol, 1,3-butylene glycol 1,4-butylene glycol, 2,2-dimethyl-1,3-butene diol, diethylene glycol, triethylene glycol, tetraethylene glycol, pentaethylene glycol, hexaethylene glycol, heptaethylene glycol, octaethylene glycol, nonethylene,glycol, decaethylene glycol, and the mono- and dimethyl, ethyl, propyl and butyl ethers thereof; monophenylethers of polyoxyethylene containing of from 2 to about 7 ethylene oxide units per molecule, ethylene oxide derivatives of furfuralcohol containing from 3 to 12 moles of ethylene oxide per molecule, ethoxylated derivatives of urea; ethoxylated derivatives of tetrahydrofurfuryl alcohol, cyclic amides such as 2-oxazolidinone and 2-imidazolidinone and their ring substituted lower alkyl derivatives such as 5-methyl-2-oxazolidinone and their N-hydroxyalkyl derivatives such as 3-(2-hydroxyethyl)-5-methyl-2-oxazolidinone, etc.

The preferred plasticizers for use in the polyvinyl alcohol materials of the present invention are the polyhydroxy compounds of a humectant nature such as glycerine, sorbitol, sucrose, 2,3-butylene glycol, 1,3-butylene glycol, 1,4-butylene glycol, 2,2-dimethyl-1,3-butene diol, diethylene glycol, triethylene glycol, tetraethylene glycol, pentaethylene glycol, hexaethylene glycol, heptaethylene glycol, octaethylene glycol, nonaethylene glycol, decaethylene glycol, and the mono- and dimethyl ethyl, propyl and butyl ethers thereof.

The fertlizers used in the present invention are well known plant foods having available water soluble compounds containing elements selected from the group consisting of nitrogen, calcium, phosphorous and potassium or mixtures thereof. Any commercial fertilizer can be used which is ground to a granular solid having a mesh size of 5 to 400 as determined by the U.S. Sieve Series and Tyler equivalents (ASTM-E-11-61). The mesh size indicates that the particles will pass through a sieve having that designation. The particles range from about 3.0 mm to 0.040 mm in average diameter.

The preferred process for preparing said fertilizer rods comprises:

A. dry blending about 100 parts by weight of a granular polyvinyl alcohol with about 1 to 20 parts by weight of a plasticizer forming a first dry blend, B. mixing said first dry blend with from about 10 to 350 parts by weight of a fertilizer to form a second dry blend followed by, C. melt extruding said second dry blend through a profile die forming a fertilizer rod.

The melt extrusion is carried out at temperatures of from about 65° to 185° C. through a die under pressures ranging from about 1,000 to 5,000 psi whereby fertilizer composition is shaped into a continuous rod. Commercial extruders can be used having screws that have a length to diameter ratio (L/D) of at least 15:1, preferable 20:1 and most preferably 24:1 that can develop pressures at the die of from about 500 to 5,000 psi, preferably 1,000 to 3,500 psi and stock temperatures in the ranges of from about 65° to 185° C., preferably 90° to 120° C. Preferably such extruders are vented and valved for control of volatiles, temperature and pressure. A properly designed high speed extruder screw sill generally be a shallow screw having a low inventory, high throughput and low residence time to minimize thermal degradation of the polymer. Heat is generated by the frictional action on the stock. The extruder cylinder is generally jacketed to control temperature by supplying or withdrawing heat. Since polyvinyl alcohol is heat sensitive the extrusion tempertures are generally kept as low as possible consistent with melt flow and smooth rod formation at the die. Commercially "vinyl type" extruders have been found to have the optimum design for extrusion of polyvinyl alcohol because they provide a low heat history in melt extrusion.

The die opening or orifice can be any geometry shaped for the fertilizer rod, i.e., round, square or rectangular. The size of the opening can range from an average diameter of ⅛ to 1 inch or larger. The die orifice has a length to diameter ratio (L/D) of 1:1 to 6:1 preferably 4:1 for optimizing rod smoothness and dimensions as extruded. The rod is generally cut to specified length as the continuous rod issues from the die. The preferred dimensions of the rod being a generally round rod having a diameter of ⅛ to ⅜ inches and a length of 1 to 6 inches or longer.

Such fertilizer rods can be molded as well as extruded, e.g., by injection or compression molding, however, for economic reasons the preferred process is extrusion. The dry blending steps of the present process can be carried out in commercial blenders. Step (A) is a typical solids-liquid blending operation wherein generally the solids are fed to a mixer followed by the liquids so that the liquids are evenly dispersed in the solids. Thne polyvinyl alcohol is a granular powder having a specific gravity of 1.19 to 1.27, a bulk density of 30/40 lbs/cu.ft., and a mesh size of 20 to 400 mesh. The plasticizers are generally liquid and disperse in the resin absorbed in the polymer providing a first dry blend. The blender can be, e.g., conical, drum, twin rotor or ribbon type blenders for this type of operation.

Step (B) is a solids-solid type blending wherein the first dry blend is mixed as in (A) with the fertilizer forming a second dry blend for extrusion in step (C).

The following examples are set forth to illustrate the invention and should not be construed as limitations thereof.

EXAMPLE 1

A polyvinyl alcohol (PVOH) polymer (100 parts) having a molecular weight of 10,000 and a residual polyvinyl acetate content of about 11 percent (89 percent hydrolyzed) was mixed with 10 parts pf glycerine in a Henschel-Prodex blender (Prodex Div., Koehring Company, Mt. Gilead, Ohio) for 5 minutes at 50° C. forming a first dry blend. About 100 parts Nitroform M of 200 mesh (Urea-formaldehyde type fertilizer from Hercules, Inc., Wilmington, Del.) was added to the blender and dry mixed for two minutes at 23° C. forming a second dry blend. The second dry blend was fed to a Killion 1 inch (2.5 cm) extruder (Killion Extruders, Inc., Verona, N.J.) having a screw with a L/D of 24:1 and a ¼ inch die with a L/D of 4:1. The extruder was operated with about 107° C. with a stock temperature of about 121° C. and a die pressure of 2,500 psi. giving dense extruded rod without bubbles or degradation and good surface, having a uniform cross-section. The second dry blend fed well in the feed section of the screw giving a uniformly continuously extruded rod. The rod was found to be completely water soluble releasing the fertilizer gradually as the rod dissolved.

EXAMPLES 2 - 7

Example 1 was repeated using varied amounts of polyvinyl alcohol, fertilizer and plasticizer as shown in Examples 2 - 7 below in Table I.

TABLE I

| Examples | PVOH* (parts) | Glycerine (parts) | Nitroform parts | Nitroform % | Stock Temp. ° C. | Pressure (psi) | Rod Condition |
|---|---|---|---|---|---|---|---|
| 2 | 100 | 5 | 56.5 | 35.0 | 185 | 200 | foamed |
| 3 | 100 | 10 | 57.6 | 38.5 | 190 | 200 | foamed |
| 4 | 100 | 15 | 62.0 | 35.0 | 121 | 2,200 | solid |
| 5 | 100 | 15 | 62.0 | 35.0 | 135 | 3,600 | solid |
| 6 | 100 | 10 | 110.0 | 50.0 | 95 | 2,800 | solid |
| 7 | 100 | 10 | 175.0 | 61.5 | 100 | 3,500 | solid |

*Polyvinyl alcohol - Examples 2, 3, 4, 6 and 7 had a polymer with about 12 percent residual polyvinyl acetate and a molecular weight of 10,000. Example 5 had a polymer with about 12 percent residual polyvinyl acetate and a molecular weight of about 96,000. The first polymer is commercially available as Gelvatol 20-30 and the second as Gelvatol 20-60 from the Monsanto Company, St. Louis, Missouri.

It is evident from the data that low temperature, high pressure extrusion provides solid rod extrusion whereas high temperature, low pressure extrusion causes the composition to foam giving poor rod extrusion. It is also evident that the fetilizer proportions can be varied over a wide range with the polymer having adequate bonding ability to give a solid strong rod. The rods were tested in water and found to be completely soluble.

EXAMPLE 8

Example 1 was repeated using diethylene glycol, triethylene glycol and sorbitol, as alternate plasticizers. Dense, coherent rods were obtained that were completely water soluble.

What is claimed is:

1. A fertilizer rod composition comprising:
    A. about 100 parts by weight of a water soluble polyvinyl alcohol polymer,
    B. about 0 to 20 parts by weight of a plasticizer for said polyvinyl alcohol, and
    C. about 10 to 350 parts by weight of a fertilizer, said composition being an uniform blend of (A), (B) and (C), or (A) and (C) when (B) is 0 bonded in the form of a rod by (A) as a matrix phase, said rod being water soluble.

2. A composition of claim 1, wherein said polyvinyl alcohol is a hydrolyzed polyvinyl acetate containing 0 to 45 percent by weight of residual polyvinyl acetate.

3. A composition of claim 1, wherein said polyvinyl alcohol has a molecular weight ranging from about 5,000 to 150,000.

4. A composition of claim 1, wherein said polyvinyl alcohol has a viscosity of 4 to 65 cps based on 4 percent aqueous solution at 20° C.

5. A composition of claim 1, wherein said plasticizer is a polyhydric alcohol.

6. A composition of claim 1, wherein said polyhydric alcohol is selected from the group consisting of glycerine, sorbitol, glycol, polyglycols having 4 to 20 carbon atoms and mixtures thereof.

7. A composition of claim 1, wherein said fertilizer is a granular solid having mesh size of 5 to 400.

8. A composition of claim 1, wherein said fertilizer is a plant food having available water soluble compounds having elements selected from the group consisting of nitrogen, calcium, phosphorous and potassium or mixtures thereof.

9. A method for preparing fertilizer rods comprising the steps:
    A. dry blending about 100 parts by weight of a granular polyvinyl alcohol with about 0 to 20 parts by weight of a plasticizer forming a first dry blend,
    B. mixing said first dry blend with from about 10 to 350 parts by weight of a fertilizer to form a second dry blend followed by,
    C. melt extruding said second dry blend through a profile die forming a fertilizer rod.

10. A process of claim 9, wherein said melt extrusion is carried out at temperatures of from about 65° to 185° C., through a die under a pressure of 1,000 to 3,500 psi forming a fertilizer rod.

11. A process of claim 9, wherein said polyvinyl alcohol is a hydrolyzed polyvinyl acetate containing 0 to 45 percent by weight of a residual polyvinyl acetate.

12. A process of claim 9, wherein said polyvinyl alcohol has a molecular weight ranging from about 5,000 to 150,000.

13. A process of claim 9, wherein said polyvinyl alcohol has a viscosity of 4 to 65 cps based on 4 percent aqueous solution at 20° C.

14. A process of claim 9, wherein said plasticizer is a polyhydric alcohol.

15. A process of claim 9, wherein said polyhydric alcohol is selected from the group consisting of glycerine, sorbitol, glycol, polyglycols having 4 to 20 carbon atoms and mixtures thereof.

16. A fertilizer rod produced by the process of claim 9.

* * * * *